Aug. 10, 1926.  
N. A. CHRISTENSEN  
1,595,381  
OIL PUMP  
Filed May 7, 1924
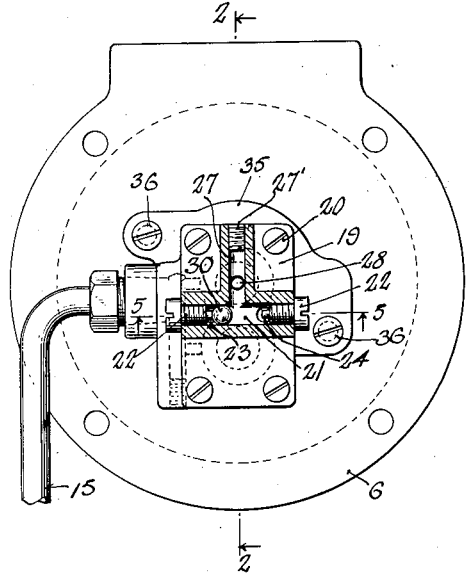
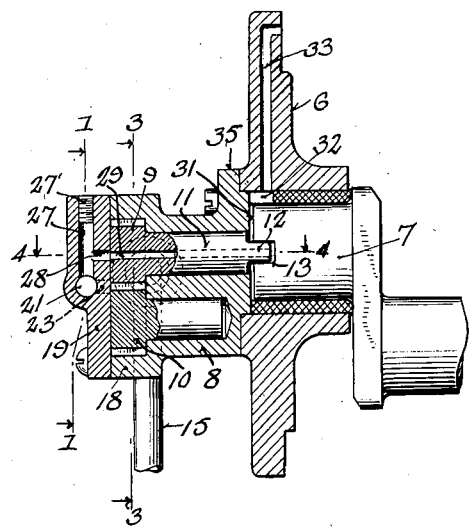
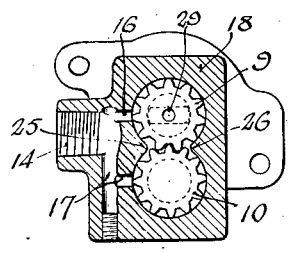
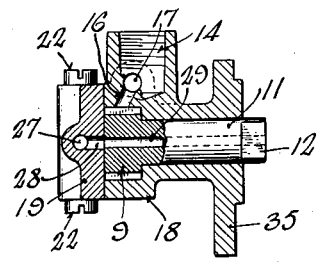
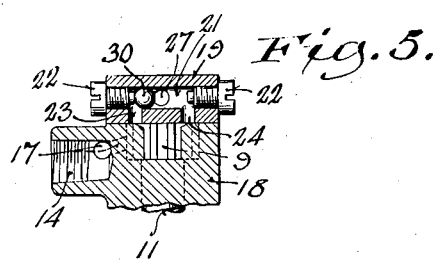
INVENTOR.  
NIELS A. CHRISTENSEN.  
BY  
Quarles & French  
ATTORNEYS.

Patented Aug. 10, 1926.

1,595,381

UNITED STATES PATENT OFFICE.

NIELS A. CHRISTENSEN, OF MILWAUKEE, WISCONSIN.

OIL PUMP.

Application filed May 7, 1924. Serial No. 711,664.

The invention relates to oil pumps.

In some situations where a unit is added to an existing machine said unit is provided with its own oiling system which is driven from the existing machine. This is particularly true of an automotive power plant and a compressor which is designed as an adjunct to said plant and driven thereby to supply compressed air for the starting and braking system of the vehicle, and it frequently happens that the motors of such power plants do not run in the same direction so that to provide an oiling system for the compressor the oil pump must be capable of running in either direction. The object of this invention is to provide an oil pump which runs in either direction without any necessity for adjustment.

The invention further consists in the several features hereinafter set forth and more particularly defined by claims at the conclusion hereof.

In the drawings: Fig. 1 is an end elevation view of an oil pump embodying the invention, taken partly in section along the line 1—1 of Fig. 2;

Fig. 2 is a sectional view taken on the line 2—2 of Fig. 1;

Fig. 3 is a detail sectional view taken on the line 3—3 of Fig. 2;

Fig. 4 is a detail sectional view taken along the line 4—4 of Fig. 2;

Fig. 5 is a detail sectional view taken along the line 5—5 of Fig. 1.

In the drawings the numeral 6 designates a shaft-bearing end plate for a mechanism, such as a compressor, whose shaft 7 is driven by the engine with which said compressor is to be associated.

As shown, the oil pump embodying the invention is mounted on the end plate and driven from the shaft 7, but other driving arrangements may be used without departing from the novel features of the invention hereinafter described.

The oil pump shown is of the gear type, including a casing 8 having a chamber in which the intermeshing pump gears 9 and 10 work. The gear 9 is provided with a shaft 11 having a tongue 12 at its end engageable in a groove 13 in the shaft 7 whereby it is driven.

The casing 8 is provided with an inlet 14 adapted to be connected with a supply of lubricating oil by a pipe 15, or to receive oil in any other suitable manner, and ducts 16 and 17 lead from said inlet to the pump chamber.

Casing is preferably made in two parts; a main body portion 18 and an end plate 19 secured to the body by screws 20 and in a leak-tight manner. The end plate 19 has a transverse passage 21 formed therein and closed off at its ends by screw plugs 22, and delivery ducts 23 and 24 establish communication between the spaces 25 and 26 of the pump chamber and said passage 21, while a passage 27, closed at its outer end by a plug 27', communicates with the passage 21 and with a delivery duct 28 which is alined with a delivery duct 29, preferably formed in the shaft 11 of the pump. A ball 30 fits quite snugly in the passage 21 though it may roll therein from one end to the other. This ball 30 is adapted to close off either one of the ducts 23 and 24 and leave the other in communication with the passage 27 and the delivery duct 28, as shown in Fig. 5, and it automatically assumes its proper position according to the direction of rotation and, therefore, the direction of the delivery of the pump. This action takes place automatically the moment the pump is started. In the construction herein shown, where the gear 9 is rotating in a clockwise direction, when viewed from the front, the oil is squeezed down through the passage 24 and forces the ball through the passage and over against the stop formed by the screw 22 at the opposite end, which acts to cover the port 23 and establish a flow of oil through passage 21, passage 27, ducts 28 and 29 into a space 31 at the end of the shaft 7 from which it passes through a slot 32 in the bearing 33 to a duct 34 leading to the lubricating system of the machine. On a reverse rotation of the gear 9 the ball will close off port 24 and the oil will pass through port 23, passages 21 and 27 to the ducts 28 and 29. Thus, the pressure of the oil in the pump automatically shifts the ball 30 so that the pump will deliver oil in either direction of rotation so that no special mechanism has to be provided to accommodate for the particular direction of rotation of the device with which the pump is associated.

The pump casing 18 has a flanged end 35 having a snug fit with the end plate 6 and secured thereto by screws 36.

I desire it to be understood that this invention is not to be limited to any particular form or arrangement of parts except in so far as such limitations are specified in the claims.

What I claim as my invention is:

1. In an oil pump, the combination with a chamber and a pair of rotary pumping members disposed therein, of delivery ducts leading from said chamber, a common delivery passage for said ducts, and a ball shiftable in said passage, for automatically closing one of said delivery ducts when said members are revolving in one direction and closing the other duct when said members are revolving in the opposite direction.

2. In an oil pump, the combination with a pump chamber and a pair of intermeshing pump gears mounted therein, of passages adjacent the intermeshing portion of said gears, a common passage in communication with said passages, a shiftable member in said common passage for closing either one of said delivery passages, depending upon the direction of rotation of said gears, and a duct through one of said gears communicating with said delivery duct.

3. The combination with a drive shaft, of an oil pump having a pump chamber, a pair of intermeshing pumping gears in said chamber, one of said gears having a shaft drivingly connected with said first-named shaft, a pair of delivery ducts from the pump chamber communicating with a common delivery duct, a duct through said pump gear shaft communicating with said common delivery duct, and a ball in said common delivery duct shiftable to close either of the delivery ducts from the pump chamber, the position of said ball depending upon the direction of rotation of said shaft.

In testimony whereof, I affix my signature.

NIELS A. CHRISTENSEN.